United States Patent [19]

Nakamura et al.

[11] 4,178,889

[45] Dec. 18, 1979

[54] INTERNAL COMBUSTION ENGINE

[75] Inventors: Hirokazu Nakamura; Tsuneo Ohinouye, both of Kyoto; Kenji Hori; Yuhiko Kiyota, both of Nagaokakyo; Tatsuro Nakagami, Kyoto; Yutaka Tsukamoto, Jyoyo; Katsuo Akishino, Kameoka, all of Japan

[73] Assignee: Mitsubishi Jidosha Kogyo Kabushiki Kaisha, Japan

[21] Appl. No.: 789,709

[22] Filed: Apr. 21, 1977

[30] Foreign Application Priority Data

Jul. 12, 1976 [JP] Japan ................. 51-83113

[51] Int. Cl.² .................................. F02B 31/00
[52] U.S. Cl. ................. 123/75 B; 123/30 C
[58] Field of Search ............. 123/30 C, 30 D, 75 B, 123/124 R

[56] References Cited

U.S. PATENT DOCUMENTS

| | | | |
|---|---|---|---|
| 3,359,958 | 12/1967 | Seggern et al. ............. | 123/75 B |
| 3,418,981 | 12/1968 | von Seggern et al. ....... | 123/30 C X |
| 3,867,914 | 2/1975 | Irimajiri ................. | 123/75 B |
| 3,884,197 | 5/1975 | Miyaki et al. ............ | 123/75 B |
| 3,930,471 | 1/1976 | Leonard et al. ........... | 123/75 B X |
| 3,987,769 | 10/1976 | Yew ...................... | 123/75 B |
| 4,018,193 | 4/1977 | Klomp ................... | 123/75 B X |
| 4,132,197 | 1/1979 | Hanawa et al. ........... | 123/75 B |
| 4,133,322 | 1/1979 | Nakamura et al. ......... | 123/30 C X |

*Primary Examiner*—Michael Koczo
*Attorney, Agent, or Firm*—Robert E. Burns; Emmanuel J. Lobato; Bruce L. Adams

[57] ABSTRACT

An internal combustion engine has a combustion chamber which communicates via an injection port with an injection chamber whose volume is 0.5 cc~1.5 cc. During the intake stroke, air-fuel mixture is introduced from an intake port into the combustion chamber, and at the same time, under the influence of high vacuum produced in the combustion chamber, a jet stream of exhaust gas, air or air-fuel mixture is violently injected from the injection port into the combustion chamber via an auxiliary intake passage communicates with the injection chamber through an auxiliary intake valve, so that the jet stream enhances the ignitability by scavenging burned gases from around a spark gap and also generates strong swirl and turbulence of air-fuel mixture in the combustion chamber.

15 Claims, 4 Drawing Figures

INTERNAL COMBUSTION ENGINE

FIELD OF INVENTION

This invention relates to an improved internal combustion engine; more particularly, it relates to an improved internal combustion engine for automobiles.

BACKGROUND OF THE INVENTION

In known automotive internal combustion engines, air-fuel mixture has not been ignited and burned readily, especially during idling and light load operation when throttle opening is decreased so that less air-fuel mixture is introduced into the combustion chamber at lower speed.

Usually, this poor ignition and combustion problem has been solved by feeding rich mixtures, i.e., mixture having low air-fuel ratios, that have enhanced combustibilities. But this solution is accompanied by increased fuel cost and increased emission of toxic, unburned hydrocarbons, carbon monoxide and so on.

To control noxious nitrogen oxide emissions, it has also been proposed to burn mixtures sufficiently leaner than the stoichiometric mixture, and to burn again part of exhaust gas by taking it out of the exhaust system and mixing with air-fuel mixture. But the low ignitability and combustibility inherent to both methods have likewise impaired driveability and fuel economies.

SUMMARY OF THE INVENTION

A primary object of this invention is to provide an internal combustion engine for vehicles that permits improving fuel economies.

Another object of this invention is to provide an internal combustion engine for vehicles that allows stable combustion of lean air-fuel mixture, which is difficult to achieve on conventional engines, thereby reducing noxious pollutants in exhaust gases.

Yet another object of this invention is to provide an internal combustion engine for vehicles that allows stable combustion of air-fuel mixture containing a large quantity of recirculated exhaust gas, which is difficult to achieve on conventional engines, thereby reducing nitrogen oxide emissions.

Still another object of this invention is to provide an internal combustion engine for vehicles that allows stable combustion of lean air-fuel mixture or mixture containing a large quantity of recirculated exhaust gas without causing extensive power output drop, driveability impairment or increase in fuel cost.

A further object of this invention is to provide an internal combustion engine for vehicles that permits controlling noxious exhaust emissions to markedly lower levels than conventional engines can, especially during idling and light-load, low-speed operation.

A yet further object of this invention is to provide an internal combustion engine for vehicles that permits improving fuel economies without causing knockings and fusion of the injection port, especially during acceleration and high-load continuous operation.

A still further object of this invention is to provide an internal combustion engine for vehicles that holds an increase of hydrocarbons in exhaust gases to a minimum by providing the injection chamber.

The aforementioned objects of this invention can be attained effectively by an internal combustion engine, which comprises a combustion chamber having an intake port and an exhaust port, a main intake passage introducing air-fuel mixture made in the air-fuel mixture producing means through said intake port into said combustion chamber, a spark plug screwed into the cylinder head so that the spark gap rests in a given position in said combustion chamber, an injection chamber provided in the cylinder head in close vicinity to said spark gap, the volume of said injection chamber being limited to between not smaller than 0.5 cc and not larger than 1.5 cc, an injection port provided in the vicinity of said spark gap so as to connect said combustion chamber with said injection chamber, an auxiliary intake passage opening to said injection chamber, an auxiliary intake valve for opening and closing said auxiliary intake passage, and means for actuating said auxiliary intake valve, wherein air, exhaust gas or air-fuel mixture introduced by way of the auxiliary intake passage is injected through the injection port into the combustion chamber under the influence of vacuum produced in the combustion chamber during the intake stroke.

BRIEF DESCRIPTION OF DRAWINGS

The nature, objects and advantages of the invention will be more fully understood from the following description of a preferred embodiment of the invention shown by way of example in the drawings in which.

DESCRIPTION OF PREFERRED EMBODIMENT

Figure 1:
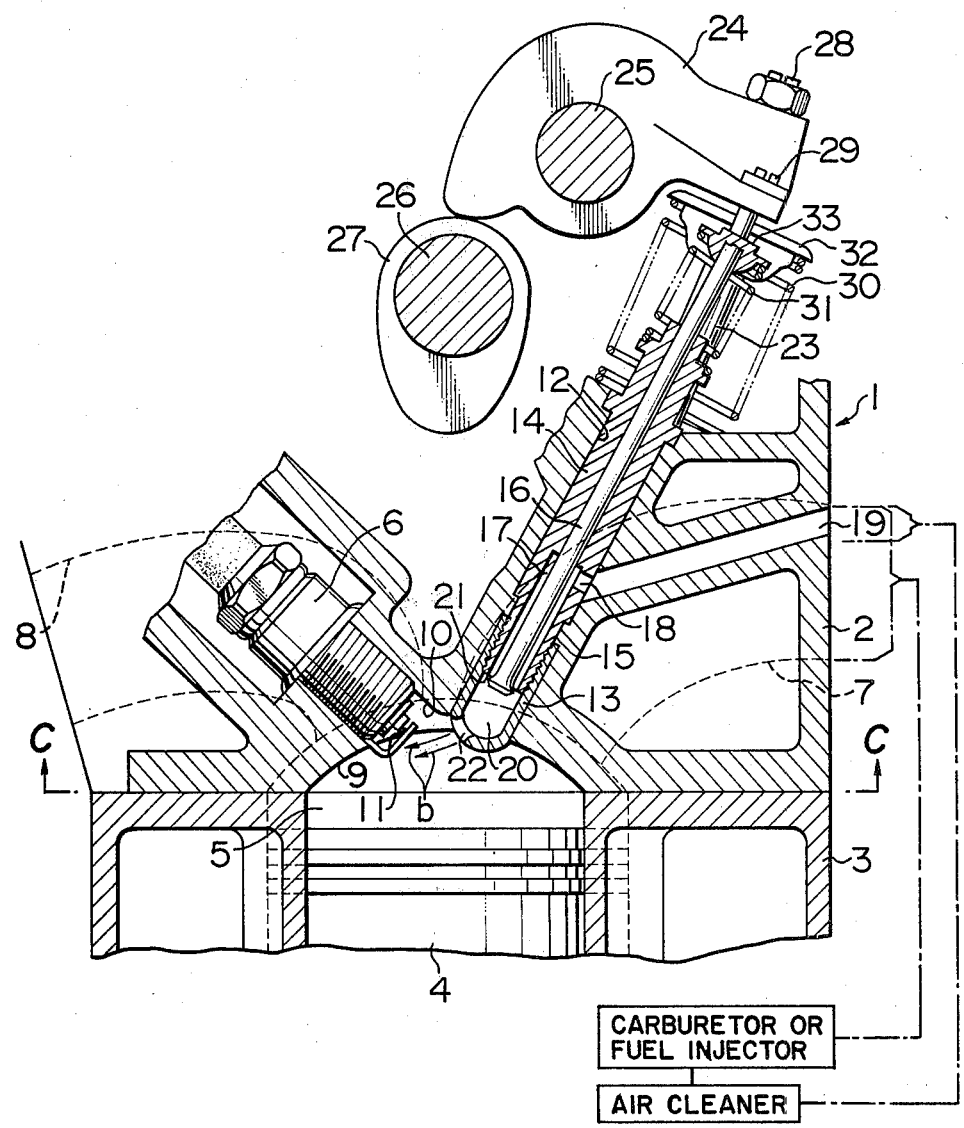
FIG. 1 is a partial cross sectional view of an internal combustion engine showing an embodiment of the invention.

In an internal combustion engine according to this invention, the throttle valve exercises a great throttling effect especially during idling and light-load operation when the throttle opening is small. Therefore, only a small quantity of air-fuel mixture is allowed to flow through the main intake passage at low speed, as a consequence of which high vacuum is produced in the combustion chamber during the intake stroke. Under the influence of this high vacuum, air, exhaust gas or air-fuel mixture introduced through the auxiliary intake passage into the injection chamber is forced through the injection port into the combustion chamber as a jet stream. This jet stream enhances the ignitability by scavenging burned gases from around the spark gap, and also generates strong swirl and turbulence in the combustion chamber that are considered to be carried over to the compression stroke. When the spark gap ignites in the latter half of the compression stroke, part of the flame enters the injection chamber to burn air-fuel mixture therein, thereby generating high temperature and high pressure. This combustion takes place instantaneously and violently, because the injection chamber is small and turbulence has been produced by the air-fuel mixture flowing from the combustion chamber during the compression stroke. Then the flame is forced through the injection port into the combustion chamber, and this forced stream also is thought to accelerate the combustion proceeding therein. The injection of the air, exhaust gas or air-fuel mixture through the injection port during the intake stroke and the injection of the flame through the injection port during the explosion stroke assist in the propagation of the flame after ignition, thereby elevating the combustion rate, making leaner air-fuel mixture combustible, and effecting fuel economies.

Despite combusting lean air-fuel mixtures, power output drop and fuel cost increase can be kept to a minimum, not only during idling and light-load operation where combustion does not proceed satisfactorily due to low air-fuel mixture distribution, low volumetric efficiencies and low combustion chamber wall temperature, but also during medium- and heavy-load operation. Further, the raised air-fuel ratio lowers the highest combustion temperature, and thereby decreases nitrogen oxide emissions remarkable.

If this internal combustion engine is used with exhaust gas recirculating means, nitrogen oxide emissions can be decreased easily, without setting the uncontrollable air-fuel ratio to a high value in the vicinity of the combustion limit. The lowering of ignitability and flame propagation rate resulting from the exhaust recirculation can be improved by the aforementioned jet stream.

The volume of the injection chamber in this internal combustion engine is limited to between not smaller than 0.5 cc and not larger than 1.5 cc. As a result, the amount of heat generated therein is limited low, even when rich mixture at a low air-fuel ratio is supplied through the intake port into the combustion chamber during acceleration or high-load continuous operation which raises the combustion temperature. This prevents fusion of the injection port or preignition due to the overheat thereof. Further, an increase in the ratio of the surface area of the combustion chamber, including that of the injection chamber, to its volume, including the volume of the injection chamber, can be kept within a moderate range. Therefore, an increase in hydrocarbon emissions resulting from the provision of the injection chamber can be held to a minimum.

Now an embodiment of this invention will be described by reference to the accompanying drawings. In a preferred embodiment of this invention shown in FIGS. 1 and 2, reference numeral 1 designates the principal portion of a four-cycle gasoline internal combustion engine for automotive use, which comprises a cylinder head 2, a cylinder block 3, a piston 4, a combustion chamber 5, a spark plug 6, an intake port 7 and an exhaust port 8. The concave portion of the cylinder head 2 defining the upper limit of the combustion chamber 5 is curved hemispherically. The spark plug 6 is screwed into a through-hole 10 made in the spheric concave wall surface 9 of the cylinder head 2 forming the combustion chamber 5, so that the spark gap 11 of the spark plug 6 is positioned on or in the vicinity of the extension of said spheric concave wall surface 9. The cylinder head 2 is also made with a through-hole 12 that opens adjacent to said spark gap 11, with approximately the same angle to the axis of the main intake valve 23. Into this through-hole 12 is fitted a hollow, cylindrical injection chamber member 13 from the side of the combustion chamber 5, and a valve guide 14 is fitted from the opposite side. By engaging the external thread at an end of the valve guide 14 with the internal thread at an end of the injection chamber member 13, they are fixed in the cylinder head 2, secured by a small-diameter section 15 of the through-hole 12, in turn, by pinching the small-diameter section 15 between them. The valve guide 14 slidably carries a mushroom-shaped auxiliary intake valve 16. In that end of the valve guide 14 which engages with the injection chamber member 13, there is left a space between the periphery of the auxiliary intake valve 16 and the inside surface of the valve guide 14 to form an auxiliary intake passage 17 that is annular in cross-section. This auxiliary intake passage 17 communicates through a hole 18 provided in the valve guide 14 with an auxiliary intake passage 19 formed in the cylinder head 2, and also opens into an injection chamber 20 of small volume enclosed by the inside surface of the injection chamber member 13 and the spread end of the auxiliary intake valve 16. This opening is closed when the spread end of the auxiliary intake valve 16 comes in contact with a valve seat 21 formed at the end of the valve guide 14.

The part of the injection chamber member 13 exposed in the combustion chamber 5 is spherically shaped. In this spherical portion is perforated an injection port 22 that connects the combustion chamber 5 with the injection chamber 20. The injection port 22 is provided in a position very close to the spark gap 11 of the spark plug 6, and is directed to the spark gap 11 or to its vicinity and, at the same time, in the favorable direction for the swirl of air-fuel mixture inducted through the intake port 7 into the combustion chamber 5, the swirl being indicated by arrow "a" in FIG. 2. That is, as is clear from FIG. 2, the injection port 22 is directed in such a way that the flow from the injection port 22 swirls in the same swirling direction as the flow from the intake port 7 with respect to the central axis of the cylinder. Furthermore, as shown in FIG. 1, the injection port 22 is directed along the spheric concave wall surface 9 of the combustion chamber 5.

Figure 2:
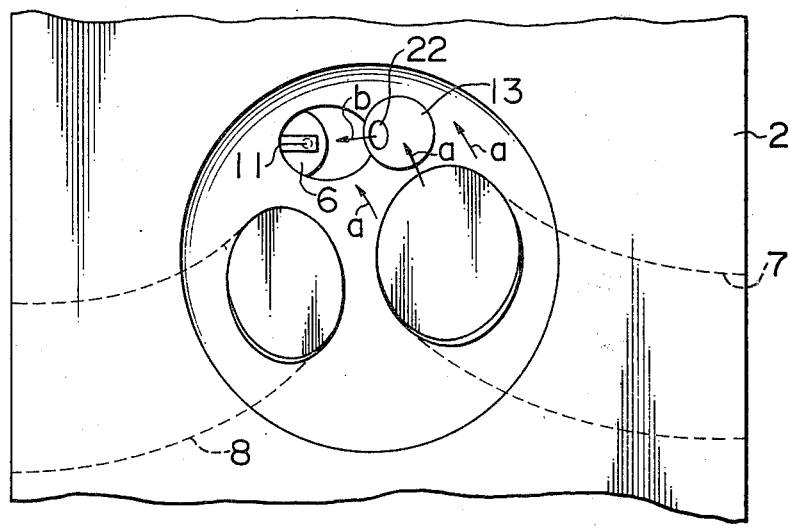
FIG. 2 is a view looking in the direction of the arrows C—C in FIG. 1.

In FIGS. 1 and 2, the direction of injection through the injection port 22 is indicated by arrow "b".

The auxiliary intake passage 19 opens to the atmosphere through an air-cleaner, while the intake port 7 communicates with air-fuel mixture producing means, such as carburetor, an intake passage having fuel injection device, etc.

A main intake valve 23 opening and closing the intake port 7 and said auxiliary intake valve 16 are mushroom-shaped valves actuated by a common rocker arm 24. The rocker arm 24 is pivoted on a rocker shaft 25 and operated by a cam 27 keyed on a camshaft 26 driven by the engine. The arm of the rocker arm 24, opposite to the end contacting the cam 27, is divided into two prongs, each of which carries adjust screws 28 and 29. The non-head end of the adjust screw 28 is in contact with the top surface of the valve stem of the main intake valve 23, and the non-head end of the adjust screw 29 with the valve stem top end of the auxiliary intake valve 16.

Items 30 and 31 are valve springs, and items 32 and 33 are spring retainers.

When the main intake valve 23 and auxiliary intake valve 16 open to start the intake stroke, vacuum produced in the combustion chamber 5 sucks air-fuel mixture made in the air-fuel mixture producing means through the intake port 7 into the combustion chamber 5, the air-fuel mixture swirling along the cylinder walls as indicated by the arrow "a" in FIG. 2. At the same time, air is sucked into the injection chamber 20 through the auxiliary intake passage 19, hole 18 and auxiliary intake passage 17.

The air inducted into the injection chamber 20 is injected through the injection port 22 into the combustion chamber 5, thus scavenging burned gases from around the spark gap 11 and promoting the air-fuel mixture swirling, and at the same time, a part of the air flows along the inner wall of the cylinder in the axial direction of the cylinder. Thereby turblence is produced and the air-fuel mixture is stirred sufficiently by the air jet.

The jet stream of air thus introduced into the combustion chamber 5 makes the air-fuel mixture contained therein leaner by mixing suitably and scavenges around the spark gap 11, so as to enhance ignitability and combustibility.

When the air-fuel mixture is ignited by the spark gap 11 in the latter half of the compression stroke, part of the flame enters the injection chamber 20 through the injection port 22. Since the injection chamber 20 is small and violent turbulence has been produced therein by the air-fuel mixture introduced from the combustion chamber 5 during the compression stroke, the incoming air-fuel mixture burns rapidly with great force to generate high temperature and pressure. Consequently, the flame bursts through the injection port 22 into the combustion chamber 5, thereby accelerating the combustion proceeding therein.

It has been experimentally proved that, if the volume v of the injection chamber 20 is large, excessive heat is generated by the combustion occurring therein, especially during acceleration and high-load continuous operation. This may fuse the injection port 22 and its vicinity in the injection chamber member 13, or cause preignition as a result of their overheat. These problems will be solved if the highest combustion temperature is lowered by delaying the ignition timing or other measures. But such measures will heavily impair engine performance and increase fuel consumption.

Also it has been experimentally confirmed that fuel consumption ratio is markedly improved when the volume v of the injection chamber 20 falls within a range between 0.5 cc and 1.5 cc while the volume of a cylinder ranges between 180 cc and 700 cc at least when the piston 4 is at the bottom dead center. Under this condition, hydrocarbon emissions are limited, the injection port 22 and its vicinity do not fuse during acceleration and high-load continuous operation, knock occurrence due to preignition is held under the tolerable limit.

Figure 3:
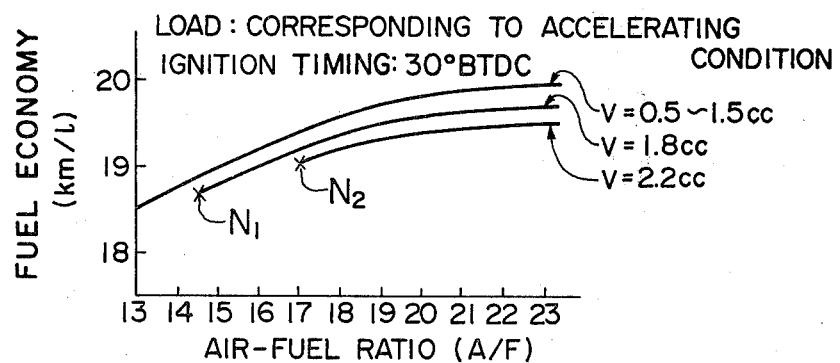
FIG. 3 is a graph showing the relation between the fuel efficiency and the air-fuel ratio determined for the illustrated embodiment using the volume of the injection chamber as a parameter.

FIG. 3 shows the relation between the air-fuel ration A/F and the fuel economy expressed in terms of kilometer gained by each liter of gasoline, measured for the embodiment shown in FIG. 1, using the volume v of the injection chamber 20 as a parameter and assuming that a load corresponding to that during acceleration is applied and the ignition timing is set 30° before T.D.C.

The following are several numerical values for the embodiment of this invention used in experiments: Total displacement $V_a = 1,597$ cc; Displacement per cylinder $V_p = 399$ cc; Cylinder bore $= 76.9$ mm; Piston stroke $= 86$ mm; Compression ratio $S = 9.3$; Total combustion chamber volume when the piston 4 is at T.D.C. $V_c = 48$ cc; Diameter of the injection port 22 $d_1 = 6$ mm; Rod diameter of the auxiliary intake valve 16 $d_2 = 4$ mm; Head diameter of the auxiliary intake valve 16 $d_3 = 8$ mm; Diameter of the injection chamber 20 $d_4 = 10$ mm; Distance x between the spark gap 11 and injection port 22 $\approx 10$ mm; and Stroke of the auxiliary intake valve 16 $\approx 5$ to 6 mm. As evident from FIG. 3, there is a tendency for the fuel efficiency to drop when the volume v of the injection chamber 20 exceeds 1.5 cc. This trend is thought to be ascribable to increased heat loss through the walls of the injection chamber 20.

FIG. 3 does not show experimental data for the volume v smaller than 0.5 cc. But forming an injection chamber 20 smaller than 0.5 cc generally involves considerable structural difficulties and strains in respect of the stroke or strength of the auxiliary intake valve 16, and so on, which may be eliminated only by the use of some costly material. Qualitatively, however, the effect of the jet stream from the injection chamber 20, occurring after ignition, drops sharply when the volume v thereof falls below 0.5 cc, the flame being cooled by the walls thereof. This results in decreased fuel economy, even during idling and light-load operation when the aforementioned jet stream effect is especially great.

$N_1$ and $N_2$ in FIG. 3 indicate the points at which knock increases sharply with the injection chamber volume of 1.8 cc and 2.2 cc, respectively. When the air-fuel ratio becomes smaller than the values at $N_1$ and $N_2$, knock due to preignition increases so sharply that engine operation becomes impeded.

Figure 4:
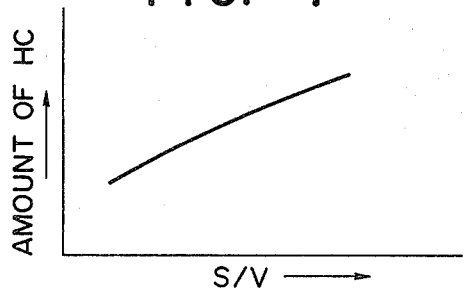
FIG. 4 is a graph showing the hydrocarbon emission characteristics of the illustrated embodiment.

FIG. 4 shows the relation between the ratio S/V, i.e., the ratio of the total surface area S to the total volume V of the injection chamber 20 and the combustion chamber 5, and the quantity of hydrocarbon emissions. Generally, hydrocarbon emissions increase with an increase in the value of S/V. When the volume v of the injection chamber 20 is not larger than 1.5 cc, provision of the injection chamber 20 does not significantly increase the value of S/V, whereby and increase in hydrocarbon emissions can be held to a minimum.

In the above-described embodiment with which experiments were conducted, the diameter $d_1$ of the injection port 22 was set at 6 mm. When this diameter $d_1$ ranges between 3 mm and 8 mm, satisfactory injection is obtained through the injection port 22. If $d_1$ is smaller than 3 mm, the flame produced by ignition may not be able to enter the injection chamber 20. If $d_1$ exceeds 8 mm, the directivity and strength of the jet stream are reduced, which heavily lowers the fuel saving effect of the jet stream.

Also in the above embodiment, the distance X between the spark gap 11 and the injection port 22 was set at 10 mm. Satisfactory results will be obtained if the distance X is kept almost within a range of 5 mm to 20 mm. If X is smaller than 5 mm, the injection port 22 and its vicinity may be overheated to cause preignition. With X larger than 20 mm, on the other hand, the jet stream effect following ignition is reduced.

What is claimed is:

1. An internal combustion engine, which comprises a cylinder head, a combustion chamber in said cylinder head and having an intake port and an exhaust port, a main intake passage introducing air-fuel mixture from an air-fuel mixture producing means through said intake portion into said combustion chamber, a spark plug screwed into the cylinder head of the engine so that the spark gap rests in a given position in said combustion chamber, an injection chamber provided in the cylinder head in close vicinity to said spark gap, the volume of said injection chamber being limited to between 0.5 cc and 1.5 cc, an injection port provided in the vicinity of said spark gap so as to connect said combustion chamber with said injection chamber, said injection port being directed toward said spark gap or its vicinity and to produce a swirl and turbulence of air-fuel mixture inducted through said intake port into said combustion chamber, an auxiliary intake passage opening to said injection chamber, an auxiliary intake valve for opening and closing said auxiliary intake passage, and means for actuating said auxiliary intake valve, wherein air, exhaust gas or air-fuel mixture introduced by way of the auxiliary intake passage is injected through the injection port into the combustion chamber under the influence of vacuum produced in the combustion chamber during the intake stroke.

2. An internal combustion engine according to claim 1, wherein said air-fuel mixture producing means comprises a carburetor.

3. An internal combustion engine according to claim 1, wherein said air-fuel mixture producing means comprises a fuel injection device.

4. An internal combustion engine according to claim 1, wherein a surface of said cylinder head defining the limit of said combustion chamber is curved concavely and hemispherically.

5. An internal combustion engine according to claim 1, wherein said auxiliary intake passage opens to the atmosphere through an air-cleaner.

6. An internal combustion engine according to claim 4, wherein said injection port is directed along the spheric concave wall surface of said cylinder head defining said combustion chamber.

7. An internal combustion engine according to claim 1, wherein the distance between said spark gap and said injection port is within a range of 5 mm to 20 mm.

8. An internal combustion engine according to claim 1, wherein said cylinder head has a through-hole which opens into said combustion chamber adjacent said spark gap, and wherein said injection chamber comprises an injection chamber member received in an inner portion of said through-hole and having a spherically shaped inner end portion which projects into said combustion chamber and in which said injection port is provided.

9. An internal combustion engine according to claim 8, wherein said auxiliary intake passage comprises a passage provided in said cylinder head and opening into said through-hole, and wherein said auxiliary intake valve comprises a tubular valve guide received in said through-hole and having an opening registering with said auxiliary intake passage and a valve member slidable in said valve guide.

10. An internal combustion engine according to claim 9, wherein said through-hole has a restricted portion intermediate its ends, said injection chamber member being disposed inwardly of said restricted portion and said valve guide being disposed in part outwardly of said restricted portion, said injection chamber member and said valve guide having cooperating means for securing them together to pinch said restricted portion between them.

11. An internal combustion engine according to claim 9, wherein said valve member of said auxiliary intake valve is a mushroom-shaped valve.

12. An internal combustion engine according to claim 1, comprising a main intake valve for opening and closing said intake port and means for actuating said main intake valve, said means for actuating said main intake valve and said auxiliary intake valve comprising a cam shaft for actuating both of said valves.

13. An internal combustion engine according to claim 12, wherein said means for actuating said main intake valve and said auxiliary intake valve further comprises a common rocker arm actuated by said cam shaft and set to open and close both of said valves substantially the same time.

14. An internal combustion engine according to claim 1, wherein said injection port is directed so that the flow therefrom swirls in the same swirling direction as the flow of the air-fuel mixtures inducted through said intake port into said main combustion chamber with respect to the central axis of the cylinder.

15. An internal combustion engine, which comprises a cylinder head, a combustion chamber in said cylinder head and having an intake port and an exhaust port, said combustion chamber being defined by a surface of said cylinder head which is curved concavely and partspherically, a main intake passage introducing air-fuel mixture from an air-fuel mixture producing means through said intake port into said combustion chamber, a spark plug screwed into the cylinder head of the engine so that the spark gap rests in a given position in said combustion chamber, an injection chamber provided in the cylinder head in close vicinity to said spark gap, the volume of said injection chamber being limited to between 0.5 cc and 1.5 cc, an injection port provided in the vicinity of said spark gap so as to connect said combustion chamber with said injection chamber, said injection port being directed along said spherical concave wall surface of said cylinder head defining said combustion chamber, an auxiliary intake passage opening to said injection chamber, an auxiliary intake valve for opening and closing said auxiliary intake passage, and means for actuating said auxiliary intake valve, wherein air, exhaust gas or airfuel mixture introduced by way of the auxiliary intake passage is injected through the injection port into the combustion chamber under the influence of vacuum produced in the combustion chamber during the intake stroke.

* * * * *